(12) United States Patent
Martinez et al.

(10) Patent No.: US 12,500,094 B2
(45) Date of Patent: Dec. 16, 2025

(54) MODULAR FLUID DELIVERY ASSEMBLY

(71) Applicant: Applied Materials, Inc., Santa Clara, CA (US)

(72) Inventors: Ricardo Martinez, Manteca, CA (US); Jagan Rangarajan, San Jose, CA (US); Sami Mustafa, Santa Clara, CA (US); Tarun Kumar Abichandani, Sunnyvale, CA (US); Lukas Sykora, Tigard, OR (US); Shih-Yu Liu, Santa Clara, CA (US); Hung X. Hoang, Santa Clara, CA (US)

(73) Assignee: Applied Materials, Inc., Santa Clara, CA (US)

(*) Notice: Subject to any disclaimer, the term of this patent is extended or adjusted under 35 U.S.C. 154(b) by 72 days.

(21) Appl. No.: 18/241,722

(22) Filed: Sep. 1, 2023

(65) Prior Publication Data

US 2025/0079192 A1   Mar. 6, 2025

(51) Int. Cl.
| | |
|---|---|
| *H01L 21/67* | (2006.01) |
| *F16K 27/00* | (2006.01) |
| *F16K 27/02* | (2006.01) |
| *F16L 9/12* | (2006.01) |

(52) U.S. Cl.
CPC ........ *H01L 21/67017* (2013.01); *F16K 27/00* (2013.01); *F16K 27/003* (2013.01); *F16K 27/0236* (2013.01); *F16L 9/125* (2013.01)

(58) Field of Classification Search
CPC .... F16K 27/00; F16K 27/003; F16K 27/0236; F16K 27/029; F16K 27/10; F16K 27/102; F16K 27/105; F16K 27/107; F16L 9/125; H01L 21/67017

USPC ........................................................ 251/331
See application file for complete search history.

(56) References Cited

U.S. PATENT DOCUMENTS

| | | |
|---|---|---|
| 5,836,355 A | 11/1998 | Markulec et al. |
| 6,394,138 B1 | 5/2002 | Vu et al. |
| 6,752,547 B2 | 6/2004 | Britcher et al. |
| 7,178,556 B2 | 2/2007 | Reid, II et al. |
| 7,204,158 B2 | 4/2007 | Morgan et al. |
| 8,307,854 B1 | 11/2012 | Vu |

(Continued)

FOREIGN PATENT DOCUMENTS

| | | | |
|---|---|---|---|
| DE | 102008010386 A1 * | 8/2008 | ........... F16K 31/061 |
| EP | 1458984 B1 | 7/2006 | |

OTHER PUBLICATIONS

Translation of DE 102008010386, year 2008.*

(Continued)

*Primary Examiner* — William M McCalister
(74) *Attorney, Agent, or Firm* — Patterson + Sheridan, LLP

(57) ABSTRACT

A fluid assembly includes a base and at least one first device. The base includes a single-piece body including a base outlet, a base inlet, and a first interface including a first interface inlet and a first interface outlet. The base also includes a first flow path segment formed within the single-piece body that extends from the base inlet to the first interface outlet. The base also includes a second flow path segment formed within the single-piece body that extends from first interface inlet. The base also includes a ground path disposed within the single-piece body. The first device is attachable to the first interface to fluidly connect a first device inlet to the first interface outlet and a second device outlet to the second interface inlet.

14 Claims, 7 Drawing Sheets

(56) References Cited

U.S. PATENT DOCUMENTS

| | | | |
|---|---|---|---|
| 8,496,029 | B2 | 7/2013 | Vu |
| 8,496,780 | B2 | 7/2013 | Ronsse et al. |
| 9,457,520 | B2 | 10/2016 | Bajaj et al. |
| 10,132,431 | B2 | 11/2018 | Fujii et al. |
| 10,597,289 | B1 | 3/2020 | Woolley et al. |
| 11,427,911 | B2 | 8/2022 | Watanabe et al. |
| 2001/0029154 | A1 | 10/2001 | Brunelli |
| 2006/0185746 | A1 | 8/2006 | Doyle |
| 2009/0032075 | A1 | 2/2009 | Lee et al. |
| 2009/0114865 | A1* | 5/2009 | Homann ............... F16K 27/003 251/129.15 |
| 2010/0084023 | A1 | 4/2010 | Melcer et al. |
| 2012/0073685 | A1 | 3/2012 | Morgan et al. |
| 2013/0015467 | A1* | 1/2013 | Krumbein ........... H01L 23/4926 257/532 |
| 2013/0056087 | A1 | 3/2013 | Taskar |
| 2013/0134184 | A1 | 5/2013 | Scarbrough et al. |
| 2015/0348865 | A1* | 12/2015 | Vincent .................. H01L 23/36 438/122 |
| 2017/0153652 | A1 | 6/2017 | McMillan et al. |
| 2017/0203511 | A1 | 7/2017 | Burkhart et al. |
| 2019/0353269 | A1* | 11/2019 | Ossmer ............... F16K 99/0015 |
| 2020/0049294 | A1 | 2/2020 | Rezaei et al. |
| 2021/0107116 | A1 | 4/2021 | Bajaj et al. |
| 2021/0159093 | A1* | 5/2021 | Melcer .................... F16J 15/106 |
| 2021/0379726 | A1 | 12/2021 | Sridhar et al. |
| 2025/0079192 | A1* | 3/2025 | Martinez ............. F16K 27/0236 |

OTHER PUBLICATIONS

Valdoz; 3D Printed Membrane Valves and Squeeze Valves a Schematic Diagram of Membrane Valve; Apr. 2023; Retrieved from the Internet: https://www.researchgate.net/figure/D-printed-membrane-valves-and-squeeze-valves-a-Schematic-diagram-of-membrane-valve_fig1_354655358.

Spray Nozzle PTY Ltd; Twin Fluid Spraying Data Sheet; 2019; Retrieved from the Internet: https://www.spraynozzle.co.za/twin-fluid-spraying/.

Spray Nozzle Technology; Air Atomizing Nozzles; Data Sheet; Retrieved from the Internet: https://www.spraynozzletechnology.com/2015/11/air-atomizing-nozzles.html.

International Search Report and Written Opinion in related application PCT/US2024/044323 dated Dec. 3, 2024.

* cited by examiner

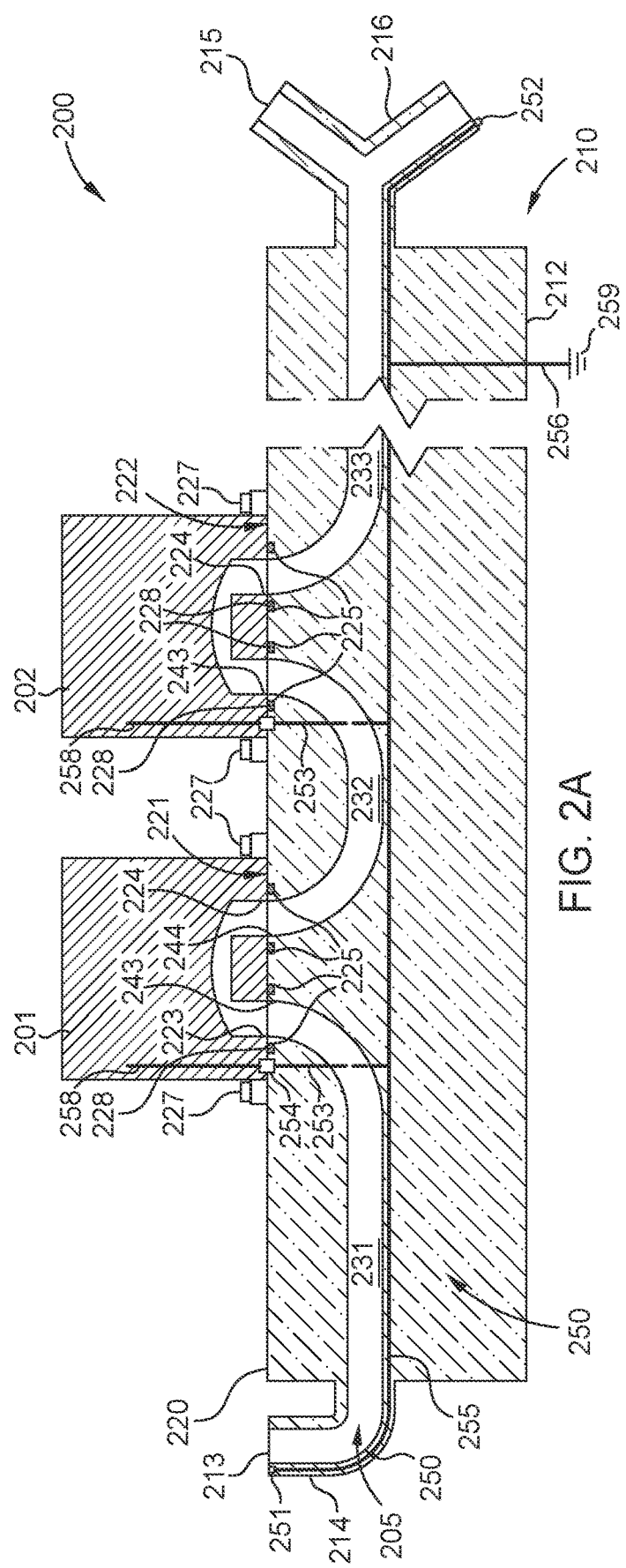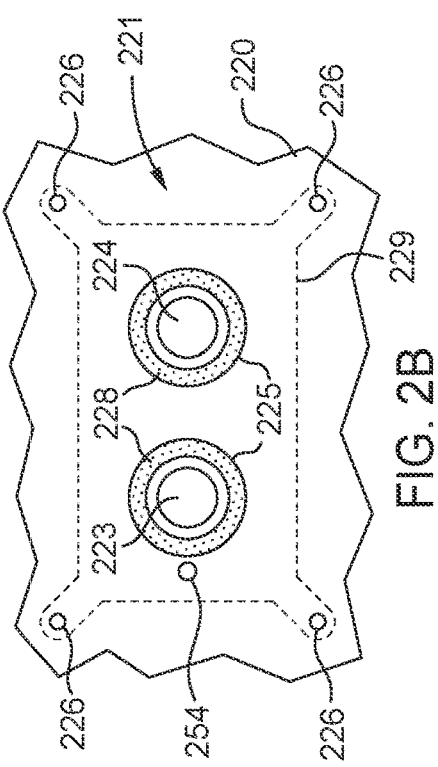
FIG. 2A
FIG. 2B

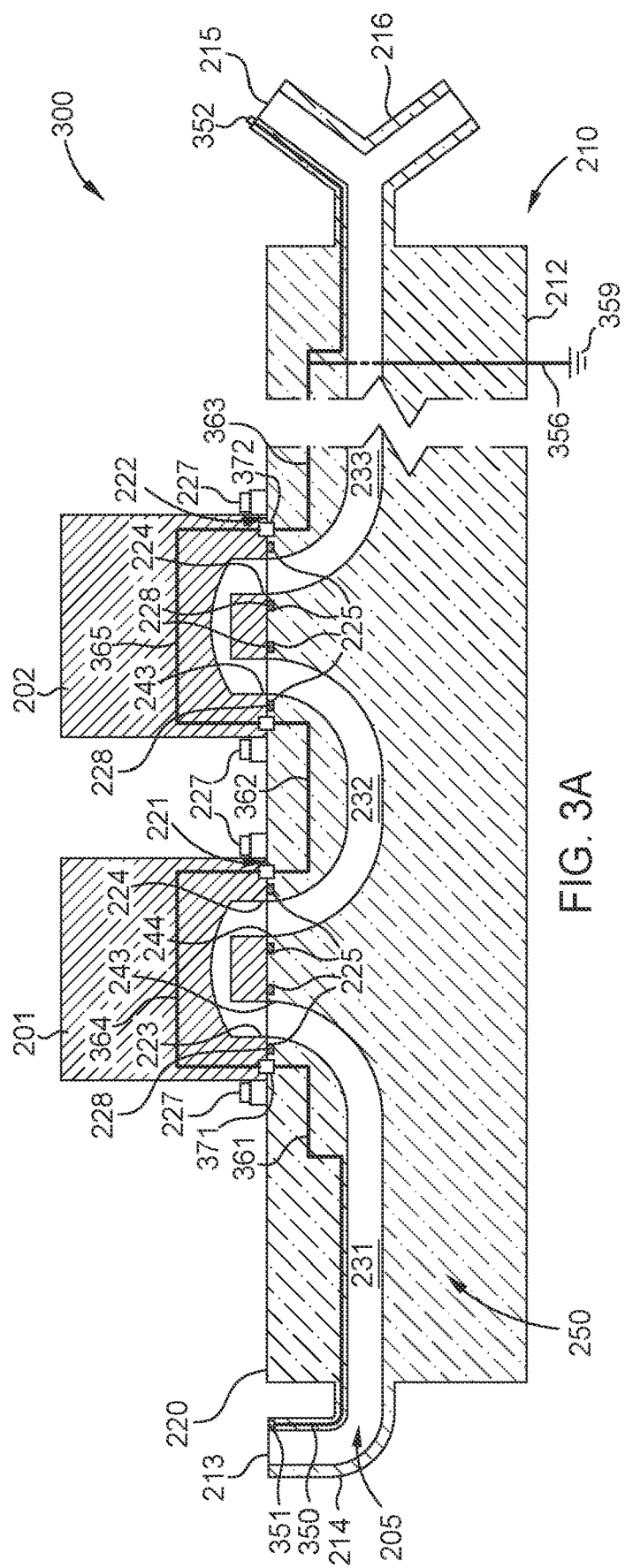
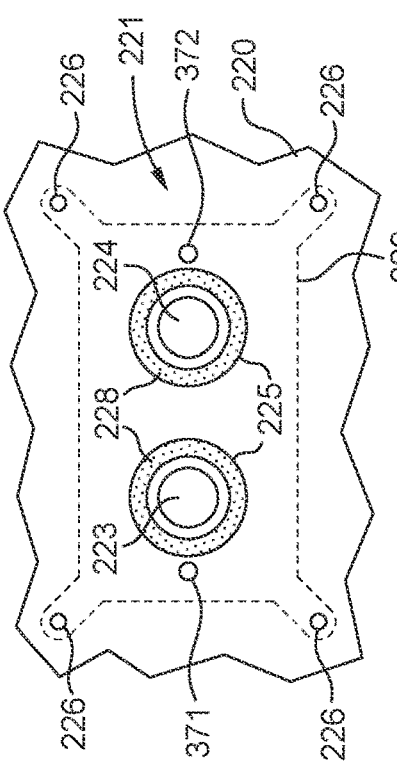
FIG. 3A
FIG. 3B

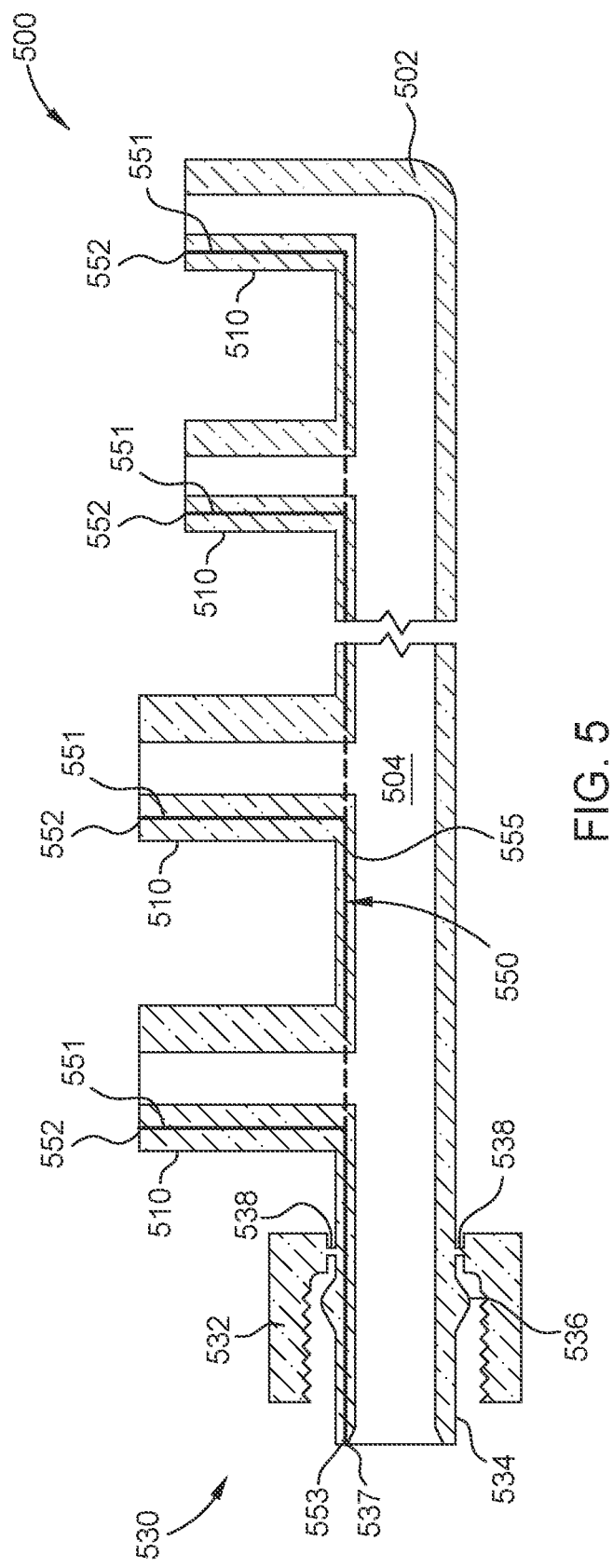

MODULAR FLUID DELIVERY ASSEMBLY

BACKGROUND

Field

Embodiments of the present disclosure generally relate to a fluid assembly for a fluid delivery module of a semiconductor manufacturing system.

Description of the Related Art

An integrated circuit is typically formed on a substrate by the sequential deposition of conductive, semiconductive, and/or insulative layers on a semiconductor substrate. Fluids are used to facilitate the formation of the integrated circuit. The fluids are delivered through a fluid delivery system that includes conduits and fluid handling device connected to a substrate manufacturing platform from a fluid source. These conduits and fluid handling devices have to be assembled. For example, the conduits may be formed from multiple pieces of piping and fittings that are attached together. These multi-piece conduits and the fluid handling devices may be attachable to one or more multi-piece flow substrates, with seals between the interface of each piece in the multi-piece flow substrates. Additionally, flexible conduits may be included between different components of the fluid delivery system. Thus, the fluid delivery system is time consuming to assemble and has multiple sealing interfaces that could fail over time. Accordingly, there is a need in the art for a more compact and modular fluid delivery system that requires less assembly and reduces the number of seals.

Additionally, some fluids used in integrated circuit manufacturing cause the buildup of electrostatic electricity within the fluid delivery system. The discharge of the electrostatic electricity can damage the fluid delivery system, such as forming holes in a component that results in a leak. Therefore, there is a need in the art for a fluid delivery system that mitigates the electrostatic discharge.

Additionally, some conduit connectors require the insertion of an expander sleeve before a conduit can be engaged with the conduit connector. There is a need in the art for a conduit connector that does not include an expander sleeve.

SUMMARY

In one embodiment, a fluid assembly includes a base and at least one first device. The base includes a single-piece body including a base outlet, a base inlet, and a first interface including a first interface inlet and a first interface outlet. The base also includes a first flow path segment formed within the single-piece body that extends from the base inlet to the first interface outlet. The base also includes a second flow path segment formed within the single-piece body that extends from first interface inlet. The base also includes a ground path disposed within the single-piece body. The first device is attachable to the first interface to fluidly connect a first device inlet to the first interface outlet and a second device outlet to the second interface inlet.

In one embodiment, a fluid conduit includes a single-piece conduit body including an internal flow path and an end portion. The fluid conduit further includes a plurality of connectors formed on the single-piece conduit body, each connector including an opening in communication with the internal flow path. The fluid conduit further includes a nut disposed around the end portion. The conduit body, the plurality of connectors, and the nut are formed by three-dimensional printing such that the nut is fixed to the end portion by at least one break-off member.

In one embodiment, a valve includes a single-piece body including valve opening and a flow path. The flow path includes a valve seat. The single-piece body is formed by three-dimensional printing. The valve also includes a valve member disposed in the valve opening that is formed by three-dimensional printing during the formation of the single-piece body. The valve member is movable from an open position where a fluid is allowed to flow through the flow path and a closed position engaged with the seat to block flow through the flow path.

In one embodiment, an atomizing nozzle unit includes a single-piece body formed by additive manufacturing and a ground path disposed in the single-piece body. The single-piece body includes a first flow path, a second flow path, and a nozzle. The nozzle includes an outer portion, an inner portion, and an annular chamber. The outer portion includes a nozzle port. The inner portion includes a third flow path configured to receive a liquid from the second flow path. The annular chamber is disposed within the single-piece body around the inner portion. The annular chamber is configured to distribute a gas from the first flow path to mix with the liquid exiting the third flow path of the inner portion.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments of the disclosure and are therefore not to be considered limiting of its scope, as the disclosure may admit to other equally effective embodiments.

FIG. 2A is an exemplary schematic cross-sectional view of a modular fluid assembly, according to embodiments described herein.

FIG. 2B illustrates a top view of a first interface of the modular fluid assembly of FIG. 2A.

FIG. 3A illustrates an exemplary schematic cross-sectional view of a modular fluid assembly, according to embodiments described herein.

FIG. 3B illustrates a top view of a first interface of the modular fluid assembly of FIG. 3A.

FIG. 5 illustrates a schematic cross-sectional view of a conduit, according to embodiments described herein.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

A modular apparatus for a fluid delivery module is disclosed herein. In one or more embodiments, fluid handling devices are attachable to a single-piece base to complete a flow path. In one or more embodiments, the base and the one or more fluid devices are grounded by a ground path.

Figure 1:
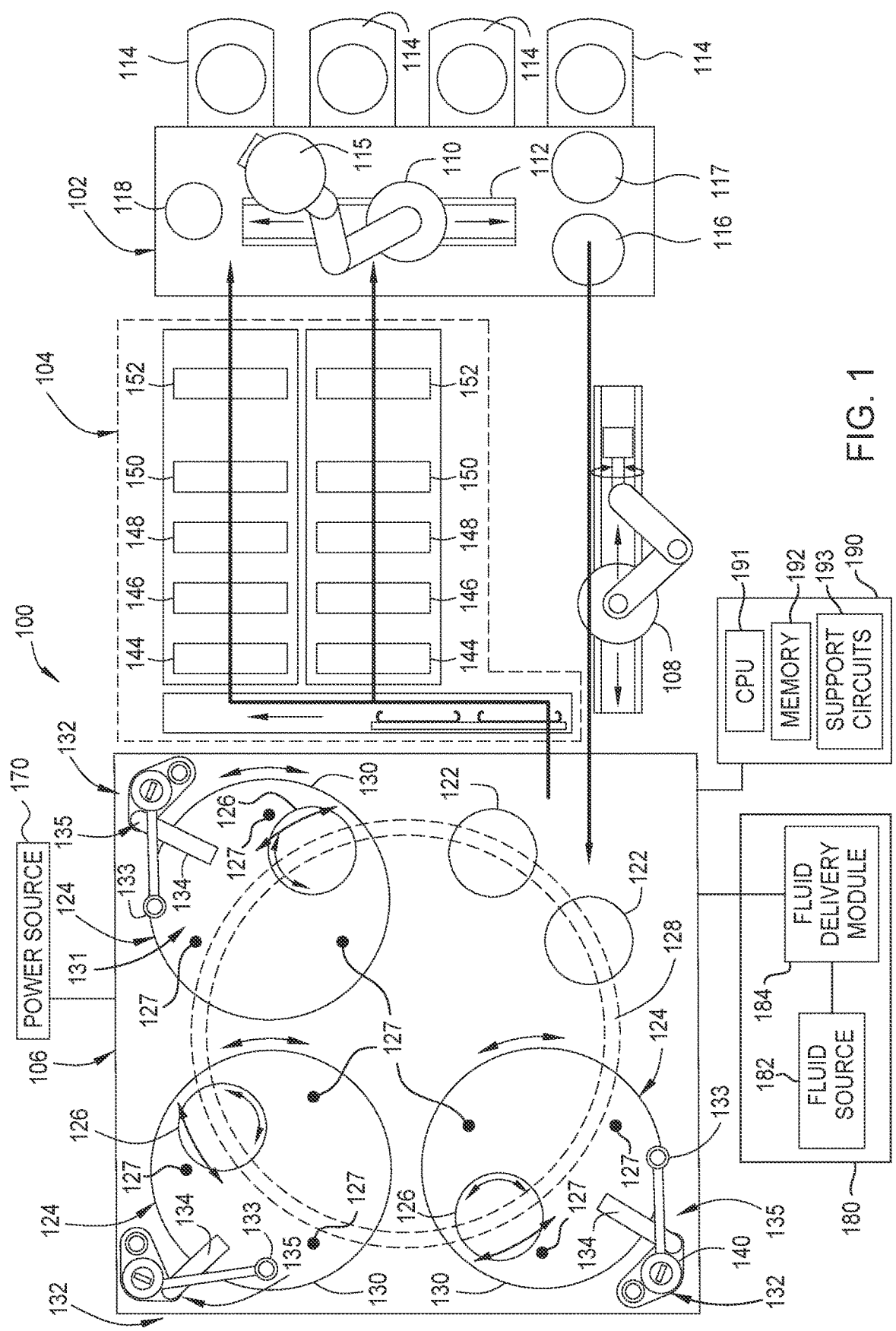
FIG. 1 depicts a schematic top view of an exemplary chemical mechanical polishing (CMP) system.

FIG. 1 is a top plan view illustrating one embodiment of a chemical mechanical polishing (CMP) system 100. The CMP system 100 includes a factory interface module 102, a cleaner 104, a polishing module 106, a fluid delivery system 180, and a controller 190. A substrate 115, such as a silicon wafer with one or more layers deposited thereon, is processed within the CMP system 100 to polish the surface of the substrate 115.

A wet robot 108 is provided to transfer the substrates 115 between the factory interface module 102 and the polishing module 106. The wet robot 108 may also be configured to transfer the substrates 115 between the polishing module 106 and the cleaner 104. The factory interface module 102 includes a dry robot 110 which is configured to transfer the substrates 115 between one or more cassettes 114, one or more transfer platforms 116, one or more metrology stations 117, and one or more pre-aligner stations 118 of the factory interface 102. Substrates 115 are loaded into the CMP system 100 from the cassettes 114. In one embodiment depicted in FIG. 1, four substrate storage cassettes 114 are shown. The dry robot 110 within the factory interface 102 has sufficient range of motion to facilitate transfer between the four cassettes 114 and the one or more transfer platforms 116. Optionally, the dry robot 110 may be mounted on a rail or track 112 to position the robot 110 laterally within the factory interface module 102. The dry robot 110 additionally is configured to receive the substrates 115 from the cleaner 104 and return the clean polished substrates to the substrate storage cassettes 114.

FIG. 1 shows an exemplary polishing module 106 that includes a plurality of polishing stations 124 on which the substrates 115 are polished while being retained in a carrier head 126 (e.g., polishing head). Each polishing station 124 includes a conditioning assembly 132 and a polishing fluid delivery module 135. While the polishing module 106 is shown having three polishing stations 124, the polishing module 106 may have more than three polishing stations 124. For example, the polishing module 106 may have a two pairs of polishing stations 124, each pair of stations 124 processing a substrate 115 independently of the other pair. The polishing stations 124 are sized to interface with one or more carrier heads 126 to facilitate polishing the substrate 115. The carrier heads 126 are coupled to a carriage (not shown) that is mounted to an overhead track 128 that is shown in phantom in FIG. 1. The overhead track 128 allows the carriage to be selectively positioned around the polishing module 106 which facilitates positioning of the carrier heads 126 selectively over the polishing stations 124 and the load cup 122. In the embodiment depicted in FIG. 1, the overhead track 128 has a circular configuration which allows the carriages retaining the carrier heads 126 to be selectively and independently rotated over and/or clear of the load cups 122 and the polishing stations 124. Additionally, the overhead tracks 128 facilitate the carriage sweeping the rotating carrier heads 126 relative to a polishing station 124 during polishing.

Each polishing station 124 includes a polishing pad 131 having a polishing surface capable of polishing a substrate 115. Each polishing station 124 includes a conditioning assembly 132 and a polishing fluid delivery module 135. In one embodiment, the conditioning assembly 132 may comprise a pad conditioning assembly 140 which dresses the polishing surface of the polishing pad 131 by removing polishing debris and opening the pores of the polishing pad 131 by use of a pad condition disk 133. In another embodiment, the polishing fluid delivery module 135 may comprise a fluid delivery arm 134 to deliver a slurry. In one embodiment, each polishing station 124 comprises a pad conditioning assembly 132. In one embodiment, the fluid delivery arm 134 is configured to deliver a fluid stream (e.g., a slurry) to a polishing station 124. The polishing pad 131 is supported on a platen 130 which rotates the polishing pad 131 during processing. Each polishing station 124 includes a polishing pad 131 secured to a rotatable platen 130. Different polishing pads 131 may be used at different polishing stations 124 to control the material removal of the substrate 115.

At least one load cup 122, such as the two load cups 122 shown in FIG. 1, is near the lower right corner of the polishing module 106 between the polishing stations 124 closest to the wet robot 108. The load cups 122 may serve multiple functions, including washing the carrier head 126, receiving the substrate 115 from the wet robot 108, washing the substrate 115, and loading the substrate 115 into the carrier heads 126.

The substrate 115 will typically have a reference mark, such as a notch, flat edge, or other type of feature that can be used to identify crystalline orientations of the substrate 115 and note a rotational orientation of a front surface of the substrate 115 relative to a central axis. In certain embodiments, the factory interface module 102 can also include a pre-aligner 118 to position the substrate 115 in a known and desirable rotational orientation. The pre-alignment of the substrate 115 to a desired rotational orientation allows the substrate 115 to be transferred to the load cup 122 having a known rotational orientation. Thus, the carrier head 126 is able to retrieve the substrate 115 at a known rotational orientation relative to the carrier head 126. For example, the pre-aligner 118 may include a reference mark detection system, such as an optical interrupter sensor (not shown), to sense when the reference mark is at a specific angular position.

In certain embodiments, the substrate 115 is placed in the metrology station 117 by the dry robot 110 prior to placing the substrate 115 on the transfer platform 116. For example, the dry robot 110 may transfer the substrate 115 from the pre-aligner 118 to the metrology station 117. The metrology station 117 is used to measures various aspects of the substrate 115. The controller 190 receives the measurements which may be used to facilitate processing the substrate 115 within the CMP system 100. The dry robot 110 may transfer the substrate 115 to the transfer platform 116 after the substrate 115 is measured in the metrology station 117.

The wet robot 108 is configured to transfer the substrate 115 from the transfer platform 116 to one of the load cups 122. A rinsed-clean carrier head 126 is moved above the load cup 122 with the unpolished substrate 115. The unpolished substrate 115 is thereafter chucked to the carrier head 126, which then moves to a position above the pad 131 of a polishing station 124 to begin the CMP process.

The fluid delivery system 180 comprises a fluid source 182 for supplying a process chemical or chemicals to the polishing system 100, and a fluid delivery module 184 for controlling and monitoring the flow rate of the fluid streams flowing from the fluid source 182 to the polishing system 100. In some embodiments, the fluid source 182 includes one or more components of the slurry used to polish the substrate 115 or a cleaning fluid used to rinse the carrier heads 126 and/or substrate 115. For example, the fluid delivery module 184 may deliver slurry to the polishing fluid delivery module 135. The fluid delivery module 184 may be used to control the mixing of one more fluid components from the fluid source 182. The fluid delivery module 184 includes a plurality of modular fluid assemblies, such as modular fluid assemblies 200, 300, 400 described herein. The modular fluid assemblies have one or more fluid handling devices, such as a valve, a pressure transducer, a flow controller, a flow meter, a temperature sensor, a check valve, a pressure regulator, or a mixer. Each modular fluid assembly may be connected to a plurality of other modular fluid assemblies by one or more conduits. The fluid delivery module 184 may include a ground circuit that leads to a ground to discharge electrostatic buildup generated by the fluid flowing within the fluid delivery module 184. While the fluid delivery system 180 is shown in relation to a CMP system 100, the fluid delivery system 180 may be used in other systems to manufacture semiconductor devices or in apparatus unrelated to semiconductor manufacturing that require the introduction and control of one or more fluids.

The controller 190 controls aspects of the CMP system 100 during a CMP process (e.g., polishing process, polishing operation, polishing). In certain embodiments, the controller 190 is one or more programmable digital computers executing digital control software. The controller 190 can include a CPU (e.g., processor) 191 situated near the polishing apparatus, e.g., a programmable computer, such as a personal computer. The controller can include a memory 192 and support circuits 193. The controller 190 can, for example, coordinate rotation of the polishing pad 131 and the carrier head 126 to perform the desired CMP process and to facilitate monitoring for the endpoint of the CMP process with endpoint sensors 127 embedded in the platen 130 and/or polishing pad 131. The controller 190 may also control the fluid delivery system 180, such as controlling the individual fluid handling devices of a modular fluid assembly within the fluid delivery module 184. The CMP process system 100 is powered by a power source 170, such as an electric power source configured to supply electric power to the components of the CMP process system 100.

The substrate 115 may be polished in one or more of the polishing stations 124. For example, a carrier head 126 may retrieve an unpolished substrate 115 from a load cup 122. The carrier head 126 and substrate 115 chucked thereto are then moved to a first polishing station 124, such as the polishing station 124 in the upper right corner of the polishing module 106 closest to the cleaner 104. The substrate 115 is then subjected to a CMP polishing operation on the first polishing station 124, such as removing a first layer formed on the substrate 115. Once the substrate 115 is done polishing in the first polishing station 124, then the carrier head 126 moves the substrate 115 to a second polishing station 124 (e.g., the polishing station 124 in the upper left corner of the polishing module 106) for additional CMP polishing. For example, the second polishing station 124 may polish the surface of the substrate 115 to form trench lines of a desired height. In some embodiments, the carrier head 126 and substrate 115 may optionally be transferred from the second polishing station 124 to a third polishing station 124 (e.g., the polishing station 124 in the lower left corner of the polishing module 106) to subject the substrate 115 to additional polishing.

After polishing, the carrier head 126 moves the polished substrate 115 chucked thereto above a load cup 122 where the polished substrate 115 is thereafter placed into the load cup 122. The wet robot 108 transports the polished substrate 115 from the load cup 122 to a cleaning chamber in the cleaner 104, where slurry residues and other contaminants that have accumulated on the surface of the substrate 115 during polishing are removed. In the embodiment depicted in FIG. 1, the cleaner 104 includes two pre-clean modules 144, two megasonic cleaner modules 146, two brush box modules 148, two spray jet modules 150, and two dryers 152. The dry robot 110 then removes the substrate 115 from the cleaner 104. In some embodiments, the dry robot 110 transfers the substrate 115 to the metrology station 117 to be measured again. In certain embodiments, the post-polish measurements can be used to adjust the polishing process parameters for a subsequent substrate. Finally, the dry robot 110 returns the substrate 115 to one of the cassettes 114.

The modular fluid assemblies of the fluid delivery module 184 described herein have a single-piece (e.g., monolithic) base that fluid handling devices can be attached to in order to complete a flow path (e.g., fluid circuit) through the modular fluid assembly. A single-piece base avoids the cost of assembling a base from multiple components and avoids the need to seal the interface of the sub-components parts to maintain the pressure integrity of the flow path within the base. The modular fluid assemblies are modular, allowing for any number or combination of fluid handling devices to be included in a single modular fluid assembly. The modular fluid assemblies also have a ground path formed within the base and/or the fluid handling devices that can ground the modular fluid assembly, such as including contacts that allow the modular fluid assembly to be integrated into a ground circuit of the fluid delivery module 184.

FIG. 2A illustrates an exemplary schematic cross-sectional view of a modular fluid assembly 200 that can be included in the fluid delivery module 184. The modular fluid assembly 200 includes at least one fluid handling device, such as a first device 201 and second device 202 shown in FIG. 2A, that are attachable to a base 210. The modular fluid assembly 200 includes an internal flow path 205 configured to receive one or more fluids from the fluid source 182.

The base 210 includes a single-piece body 212 (e.g., monolithic body). The single-piece body 212 includes a base inlet 213 and a base outlet 215. The base inlet 213 and base outlet 215 may be at opposing ends of the single-piece body 212 as shown in FIG. 2A. The base inlet 213 may be formed in an inlet connector 214, shown as an elbow connector, of the single-piece body 212. The base outlet 215 may also be formed in an outlet connector 216, such as a Y-shaped connector, of the single-piece body 212.

The top surface 220 of the single-piece body 212 also includes an interface for each fluid handling device, shown as first interface 221 and second interface 222 in FIG. 2A. FIG. 2B illustrates a top view of the first interface 221, which is also representative of the second interface 222. The first interface 221 includes an interface outlet 223 and an interface inlet 224. The first interface 221 may have a seal seat 225 formed around the interface outlet 223 and interface inlet 224. The seal seat 225 may be a groove formed around the opening of the respective interface outlet 223 or interface inlet 224. One or more fastener openings 226 may be formed in the first interface 221. Each fastener opening 226 is configured to receive a fastener 227 used to secure the first device 201 to the base 210. The dashed line 229 represents the perimeter of the first device 201 when placed into engagement with the first interface surface 221.

Each fluid handling device 201, 202 includes a device inlet 243 connectable to the interface outlet 223 and a device outlet 244 connectable to the interface inlet 224. Seals 228 engaged with the seal seats 225 seal the connection between the device inlet 243 and interface outlet 223 and the connection between the device outlet 244 and the interface inlet 224 when the first fluid handling device 201 is attached to the base 210. In some embodiments, the interface inlet 223 and interface outlet 224 have a lip that protrude from the top surface 220 and will be inserted into the corresponding device inlet 243 and device outlet 244.

As shown in FIG. 2A, the single-piece body 212 includes a first flow path segment 231, a second flow path segment 232, and a third flow path segment 233 formed therein. The first flow path segment 231 extends from the base inlet 213 to the interface outlet 223 of the first interface 221. The second flow path segment 232 extends from the interface inlet 224 of the first interface 221 to the interface outlet 223 of the second interface 222. The third segment 233 extends from the interface inlet 224 of the second interface 222 and is in fluid communication with the base outlet 215. Forming the flow path segments 231-233 in the same single-piece body 212 eliminates seals that would be necessary if the flow path segments were partially disposed in a base formed from a multi-piece body. In other words, a single-piece body 212 eliminates time and cost necessary to connect and seal multiple body pieces together.

The flow path 205 extends from the base inlet 213 to the base outlet 215. In some embodiments, fluid flows through the flow path 205 as follows. Fluid enters the flow path 205 through the base inlet 213, where the fluid flows through the first flow path segment 231 and enters the device inlet 243 of the first device 201 from the interface outlet 223 of the first interface 221. The fluid flows through the first device 201 from the device inlet 243 to the device outlet 244, where the fluid enters the second flow path segment 232 through the interface outlet 234 of the first interface 221. The fluid then flows through the second flow path segment 232 and into the second device 202 through the device inlet 243 of the second device 202 from the interface outlet 223 of the second interface 222. The fluid flows through the second device 202 from the device inlet 243 to the device outlet 244, where the fluid enters the third flow path segment 233 through the interface outlet 234 of the second interface 222. The fluid then flows through the third flow path segment 233 and out the base outlet 215.

The single-piece body 212 is formed by additive manufacturing process, such as a three-dimensional (e.g., 3D) printing process. For example, the single-piece body 212 may be 3D printed from one or more materials suitable for receiving one or more fluids from the fluid source 182 used in semiconductor manufacturing. In 3D printing, a printhead ejects droplets of a formulation (e.g., ink of printable materials) onto a surface from a nozzle, then cures the droplets with a light, e.g., ultraviolet light, from a light source, such as an LED or focused lamp in the printer. The 3D printing allows for different materials to be deposited in different portions of the single-piece body 212. For example, the single-piece body 212 may be formed from a high-purity polymer material, such as a perfluoroalkoxy alkanes (PFA) material, Teflon, polyvinylidene fluoride (PVDF), or a combination of high-purity polymer materials. In some embodiments, the single piece body 212 may be made from polytetrafluoroethylene (PTFE), ethylene tetrafluoroethylene (ETFE), polyether ether ketone (PEEK), Ultem (polyetherimide), and polyethylene terephthalate (PET).

An additive manufacturing process may include, but is not limited to a process, such as a polyjet deposition process, inkjet printing process, fused deposition modeling process, binder jetting process, powder bed fusion process, selective laser sintering process, stereolithography process, vat photopolymerization digital light processing, sheet lamination process, directed energy deposition process, or other similar 3D deposition process. In some embodiments, the additive material process can be used to form the single-piece body 212 from one material or from multiple different materials.

In some embodiments, additive manufacturing may be used to form a mold of the single-piece body 212. The single-piece body 212 may then be cast in the mold. In some embodiments, the mold is a sacrificial mold which is degradable (e.g., dissolvable), allowing the single-piece body 212 cast within to be removed by degrading the mold. For example, a degradation chemical (e.g., acid) may be used to flush out the mold material used to form a flow path segment in the single-piece body 212.

Fluid flow through the flow path 205 in the modular fluid assembly 200 can generate electrostatic buildup. This electrostatic buildup can discharge and cause the material of the first device 201, second device 202, and single-piece base 212, and/or conduit coupled to the base inlet 213 and base outlet 215, to melt or degrade, which can result in the formation of a leak path. The base 210 includes a ground path 250 to discharge electrostatic build up in the modular fluid assembly 200 generated by the flowing fluid to a ground 259. The ground path 250 may be formed from a material that is more electrically conductive than the material that the single-piece body 212 is formed from. The ground path 250 may be a conductive wire or filament, such as a copper wire, that the single-piece body 212 is printed or cast around. In some embodiments, the ground path 250 is also formed by additive manufacturing. For example, the ground path 250 is printed from a conductive material during the printing of the single-piece body 212 from a polymer material. For example, this conductive material may be a printed from a metallic material, such as aluminum or copper.

In some embodiments, the ground path 250 extends a length of the single-piece body 212 from the inlet connector 214 to the outlet connector 216. For example, the ground path 250 may have a first contact 251 formed at the end of the inlet connector 214 and a second contact 252 formed at the end of the outlet connector 216. The first contact 251 and second contact 252 are engageable with a separate ground path in a conduit or other modular fluid assembly that is connected with the inlet connector 214 and outlet connector 216, respectively. In some embodiments, the first contact 251 and second contact 252 may be a plug or a socket contact configured to engage with a corresponding contact of the separate ground path. FIG. 2A shows the first contact 251 as a socket and the second contact 252 as a plug. The ground path 250 may also have branches 253 from a main path 255 that extend to an interface contact 254 formed on each interface surface 221, 222 such that the first device 201 and second device 202 are also grounded to the ground 259. For example, each device 201, 202 may have a ground wire 258 with a contact configured to engage with the interface contact 254, such as each device 201, 202 having a socket that a plug embodiment of the contact 254 extends into. In some embodiments, the ground path 250 may be a single wire or filament that extends fully or partially through the single-piece body 212 that does not have branches 253 off the main path 255.

The ground path 250 in FIG. 2A is shown having a ground branch 256 extending to the ground 259 underneath the single-piece body 212. In some embodiments, the ground branch 256 is eliminated. Instead, the ground path 250 is part of a ground circuit through the fluid delivery module 184 that leads to the ground 259. For example, the first contact 251 or the second contact 252 may be engaged with a separate ground path of the ground circuit that leads to the ground 259 through one or more additional components of the fluid delivery module 184. In some embodiments, the ground circuit extends or is connected with each component in the fluid delivery module 184.

The fluid handling devices, such as the first and second devices 201, 202 shown in FIG. 2A, may be one or more of a valve, a pressure transducer, a flow controller, a flow meter, a temperature sensor, a check valve, a pressure regulator, or a mixer. Each fluid handling device may be controlled by the controller 190.

In some embodiments, the modular fluid assembly 200 includes more than two flow handling devices, with the top surface 220 including an interface with an interface outlet 223 and interface inlet 224 for each additional flow handling device. These additional fluid handling devices and interfaces may be located where the break is located at in FIG. 2A, and the additional fluid handling devices are integrated into the flow path 205 and are fluidly coupled together in a similar manner as described above with respect to the first and second devices 201, 202. Additionally, each additional fluid device may be connected to the ground path 250 by a branch 253. For example, rather than the third flow path segment 233 leading to the base outlet 215, the third flow segment 233 connects with an interface outlet 223 of a third interface such that the fluid flows into an device inlet 243 of a third device. The fluid flows through the third device from the device inlet 243 to the device outlet 244, where the fluid then enters an additional flow path segment extending from the interface outlet 234 of the third interface to the base outlet 215.

FIG. 2A shows a single flow path 205 through the single-piece body 212 and the fluid handling devices 201, 202 attached thereto. In some embodiments, the single-piece body 212 includes multiple independent flow paths 205, each with their own set of fluid handling devices. For example, these independent flow paths may be parallel to one another. In some embodiments, each independent flow path formed within the single-piece body 212 has the same or different fluid handling devices. For example, each independent flow path may be used to supply a fluid for a different process used in the manufacturing of semiconductor devices.

FIG. 3A illustrates a schematic cross-sectional view of a modular fluid assembly 300. Modular fluid assembly 300 has similar components as modular fluid assembly 200 as indicated by the reference signs without reciting the description of these components of the modular fluid assembly 200 for brevity.

Modular fluid assembly 300 includes a segmented ground path 350 connectable to a ground 359. As shown, the segmented ground path 350 includes a first ground segment 361, a second ground segment 362, and a third ground segment 363 disposed in the single-piece body 212 that are used to ground the single-piece body 212. The ground path segments within the single-piece body 212 may be each be a segment of a conductive wire or filament that the single-piece body 212 is printed or cast around, or each segment may be printed from a conductive material.

The segmented ground path 350 also includes a segment disposed in each fluid handling device to complete a ground circuit and ground each fluid handling device when the fluid handling device is attached to the base 210. The segments in the fluid handling devices are shown as a fourth segment 364 disposed in the first device 201 and a fifth ground segment 365 in the second device 202. The segmented ground path 350 may include a first contact 351 formed at an end of the inlet connector 214 and second contact 352 formed at an end of the outlet connector 216 similar to the ground path 250.

The first ground segment 361 extends from a first interface contact 371 of the first interface 221 and may extend to the first contact 351. The second ground segment 362 extends from a second interface contact 372 formed on the first interface surface 221 to the first contact 371 of the second interface surface 222. FIG. 3B illustrates the first interface 221, which is representative of the second interface 222. The first interface 221 shown in FIG. 3B is similar to the first interface 221 FIG. 2B, except that it includes the first interface contact 371 and the second interface contact 372 rather than interface contact 254. The third ground segment 363 extends from the second interface contact 372 of the second interface 222, and may extend to another interface contact or to the second contact 352 in some embodiments. The fourth ground segment 364 is engaged with the first interface contact 371 and the second interface contact 372 of the first interface 221. Similarly, the fifth ground segment 365 is engaged with the first interface contact 371 and the second interface contact 372 of the second interface 222. The first and second interface contacts 371, 372 may be plugs or sockets that the ground segments within the fluid handling devices (e.g., segments 364, 365) interface with.

Similar to ground path 250, the segmented ground path 350 may include a ground branch 356 that extends to the ground 359 located underneath the single-piece body 212. In other embodiments, the segmented ground path 350 is part of a ground circuit of the fluid delivery module 184 that is electrically coupled to the ground 359.

Figure 4A:
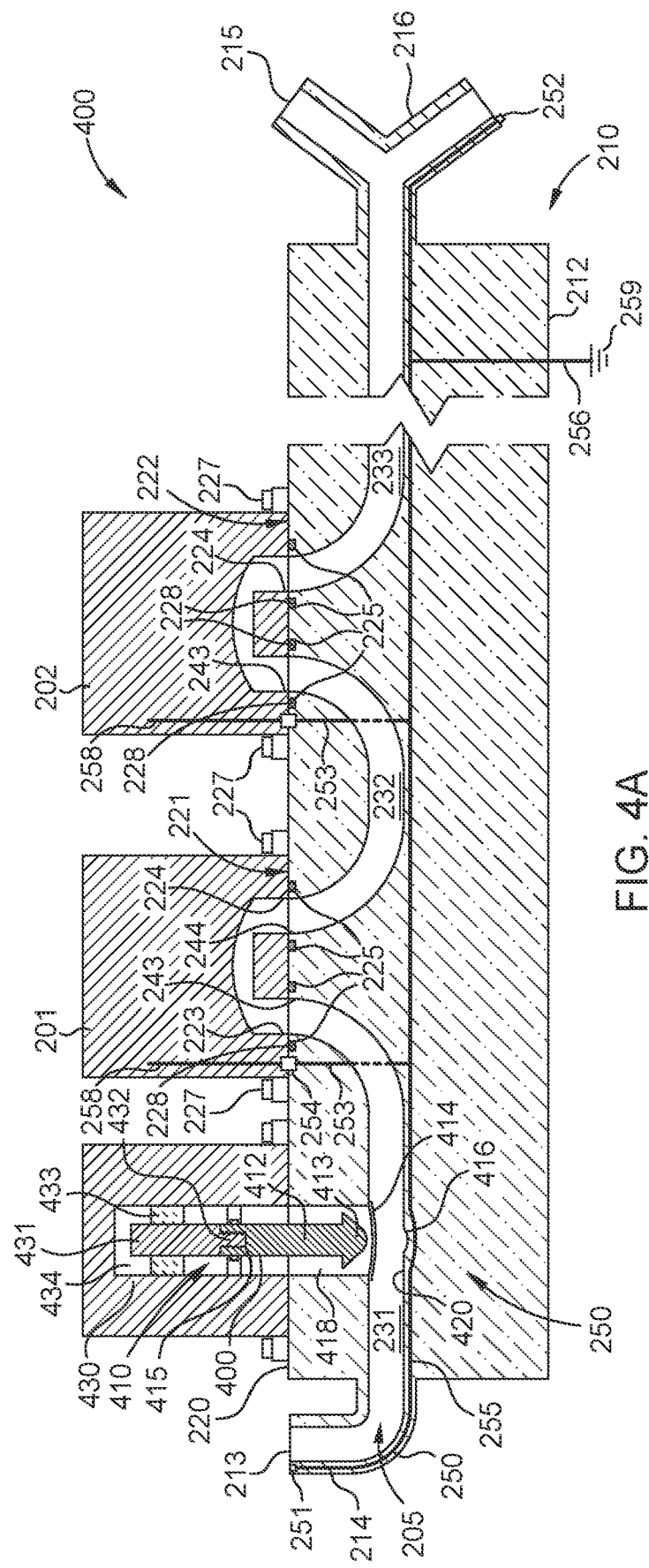
FIG. 4A illustrates an exemplary schematic cross-sectional view of a modular fluid assembly showing an integral valve as being open, according to embodiments described herein.
Figure 4B:
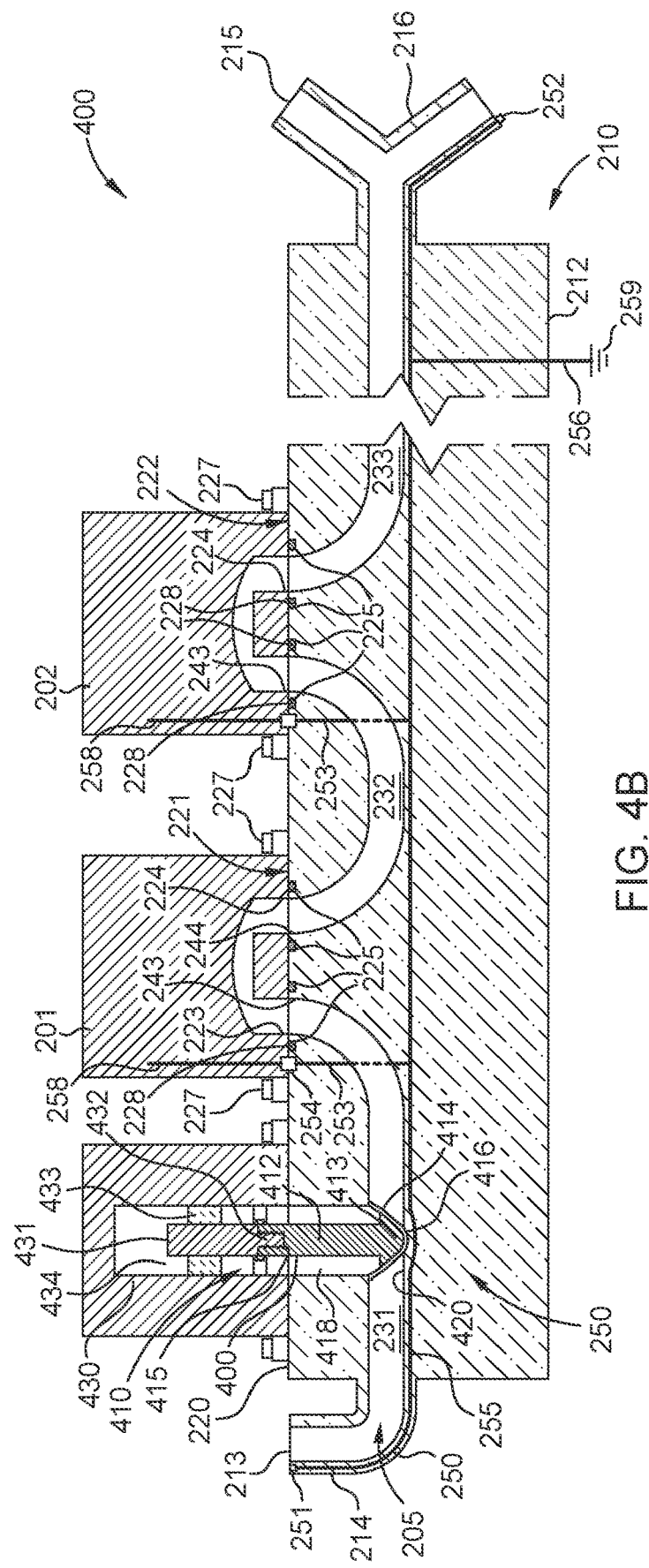
FIG. 4B illustrates a cross-sectional view of the modular fluid assembly of FIG. 4A showing the integral valve as being closed.

FIGS. 4A-4B illustrate an exemplary schematic cross-sectional view of a modular fluid assembly 400. Modular fluid assembly 400 has similar components as modular fluid assembly 200 as indicated by the reference signs without reciting the description of these components of the modular fluid assembly 200 for brevity. Modular fluid assembly 400 may include an integral valve 410 formed in the base 210 in addition to one or more fluid handling devices, such as devices 201, 202, that are attachable to the base 210. The integral valve 410 is formed with the single-piece body 212 and can be positioned to selectively close any of the flow path segments, such as the first flow path segment 231 in FIG. 4.

The integral valve 410 shown in FIG. 4A is a diaphragm valve that includes a shaft 412, a diaphragm 414, and a valve seat 416. The valve seat 416 is formed on a lower surface 420 of the first flow path segment 231. The valve seat 416 may be a recess, such as the v-shaped groove shown in FIG. 4A. In other embodiments, the valve seat 416 may protrude into the flow path segment 231. The diaphragm 414 is positioned at an end of an opening 418 formed within the single-piece body 212 and located above the valve seat 416. The diaphragm 414 is integrally formed with the single-piece body 212, and may be made of a flexible polymer material. The diaphragm 414 isolates the first fluid segment 231 from the opening 418.

FIG. 4A shows the shaft 412 disposed in the opening 418 in an open position. When the shaft 412 is in the open position, the diaphragm 414 is in an un-deformed state. The shaft 412 moveable in a downward direction to press the head 413 of the shaft against the diaphragm 414, causing the diaphragm 414 to deform and protrude into the first fluid segment 231 to restrict the fluid flow. The shaft 412 is moveable to a closed position, as shown in FIG. 4B, to cause the diaphragm 414 to engage the valve seat 416 to block flow through the first flow path segment 231. The shaft 412 can be moved to one or more positions between the open and closed position to create the desired restriction within the first flow path segment 231.

In some embodiments, the head 413 of the shaft 412 and the diaphragm 414 are separate pieces. The head 413 may have a shape that corresponds with the valve seat 416 to promote a tight seal when the head 413 forces the diaphragm 414 against the valve seat 416 in the closed position. In some embodiments, shaft 412 and diaphragm 414 are integral with one another (e.g., a single-piece), with the head 413 being integral with the diaphragm 414. The integrated head 413 and diaphragm 414 may have a shape that corresponds with the shape of the valve seat 416.

The end of the shaft 412 extends from an upper end of the opening 418 and extends above the top surface 220 of the single-piece body 212. A valve actuator 430 is connectable to the portion of the shaft extending out of the single-piece body 212. For example, the end of the shaft 412 may have a threaded opening 415 that engages a threaded end 432 of a plunger shaft 431 of the valve actuator 430.

The valve actuator 430 is used to move the shaft 412 to the open position, closed position, and positions therebetween. The valve actuator 430 may be a pneumatic, hydraulic, or electric actuator. For example, the valve actuator 430 may be a linear servo actuator. The valve actuator 430 may be controlled by the controller 190. FIG. 4A shows the valve actuator 430 as a hydraulic actuator, with the plunger shaft 431 includes a piston 433 sealed against the walls of a sealed chamber 434 within the valve actuator 430 that is moveable in response to a hydraulic fluid through ports on either side of the piston 433.

In some embodiments, the shaft 412, the diaphragm 414, the valve seat 416, and the opening 418 are printed while the single-piece body 212 is printed. In some embodiments, a break-off between the shaft 412 and upper end of the opening 418 may be formed during the printing that is later broken to allow the movement of the shaft 412 relative to the opening 418. In some embodiments, the shaft 412 is printed without a break-off between the shaft 412 and the opening 418, such as when the shaft 412 is an integral piece with the diaphragm 414. In other embodiments, the shaft 412 and diaphragm 414 are positioned in a mold, and with the single-piece body 212 including the valve seat 416 and opening 418 being cast in the mold. The valve actuator 430 is connected to the shaft 412 after the integral valve 410 is formed. Forming the integral valve 410 with the single-piece body 212 eliminates fasteners and seals that would ordinarily be necessary to attach a valve.

While FIGS. 4A and 4B illustrate integral valve 410 as a diaphragm valve, the integral valve 410 may be a different type of valve, such as a ball valve, a butterfly valve, a check valve, or a gate valve.

In some embodiments, the integral valve 410 is formed as a standalone valve and not formed as part of a single-piece body 212 of a modular fluid assembly 400. Instead, the integral valve 410 is printed within a single-piece valve body that has a flow path through it that can be selectively blocked. The flow path includes the seat 416. This standalone valve can be used in applications related to semiconductor manufacturing. In some embodiments, the standalone valve may be used in applications unrelated to semiconductor manufacturing. The standalone valve may also have a ground path formed in the single-piece valve body.

FIG. 5 illustrates a schematic cross-sectional view of a conduit 500 of a fluid delivery module 184. The conduit 500 could be directly coupled to the inlet connector 214 or outlet connector 216 of any of the modular fluid assemblies 200, 300, 400 described herein. The conduit 500 could also be included as a replacement for flexible tubing and conventional rigid conduits, which require the manual assembly of conduit segments and fittings. The conduit 500, similar to the modular fluid assemblies 200, 300, and 400, is formed by either additive manufacturing or by being cast in a mold. Thus, the conduit 500 is formed as a single-piece that eliminates the needs to assemble a conduit form multiple pieces and provide seals or welds therebetween.

The conduit 500 is shown as a single-piece with a single-piece body 502 having an internal flow path 504 formed therein. The single-piece body 502 may include one or more connectors 510 that are in communication with the flow path 504. The connectors 510 may be different sizes based on the size of the flow conduits that will be attached to each connector 510. In some embodiments, the connectors 510 may have threads formed on an exterior surface to interface with a different flow conduit. In other embodiments, the connectors 510 may have threads formed on an interior to interface with a different flow conduit.

The conduit 500 may also include at least one end connector 530 located at one end of the conduit 500. The end connector 530 may include a nut 532 disposed around an end portion 534. The nut 532 may have threads. The end portion 534 may have a protrusion 536 on the exterior of the single-piece body 502 that prevents the nut from falling off the end portion 534. When the conduit is formed, a plurality of break-offs 538 may be formed between the nut 532 and end portion 534 that are broken to allow the nut to move relative to the end portion 534. The nut 532 may be rotated into engagement with another connector, such as inlet connector 214, to secure the end portion 534 into engagement to the other connector. In some embodiments, the other connector is a flexible tubing inserted around the end portion 534, and the nut 532 is used to secure the flexible tubing to the exterior of the end portion 534.

In conventional conduit connectors, the nut is placed on around the connector and then an expander sleeve is inserted into an opening of the connector to expand the diameter of the connector to retain the nut on the connector. The end connector 530 eliminates the expander sleeve and the time needed to place the nut on the connector and the time needed insert the expander sleeve to retain the nut because the protrusion 536 is formed along with the other components of the end connector 530, including the nut 532.

The conduit 500 may include a ground path 550 disposed within the single-piece body 502. The ground path 550 may have branches 551 off the main line 555 that extend to a connector contact 552 on the end of each connector 510. The connector contact 552 is engageable with a ground path of a conduit that is coupled to the connector 510. Additionally, the ground path 550 may have a contact 553, such as being formed at an end 537 of the end portion 534. The contact 553 is engageable with a ground path of a conduit that is coupled to the end connector 530. The contacts 552, 553 allow the ground path 550 to be connected to a ground circuit that leads to a ground of the fluid delivery module 184.

In some embodiments, the fluid delivery module 184 includes only one or more of the modular fluid assemblies 200, 300, 400, and a plurality of single-piece conduits, which advantageously allows the fluid delivery module 184 to be assembled in a compact fashion, which reduces the overall footprint of the fluid delivery module 184.

In some embodiments, the ground path, such as ground paths 250 and 350, is not connected to other ground paths and therefore does not extend from a contact at the end of the inlet connector 214 to the outlet connector 216. In some embodiments, a contact of the ground paths 250 and 350 are not formed in an end of a connector, but is instead located at another surface of the single-piece body 212. In some embodiments, the ground path 250 and 350 may be a first ground path through the single-piece body 212, with additional independent ground paths being formed through the single-piece body 212.

In some embodiments, the one or more connectors 510 may be similar to end connector 530, such as including a protrusion 536 and a nut 532.

Figure 6:
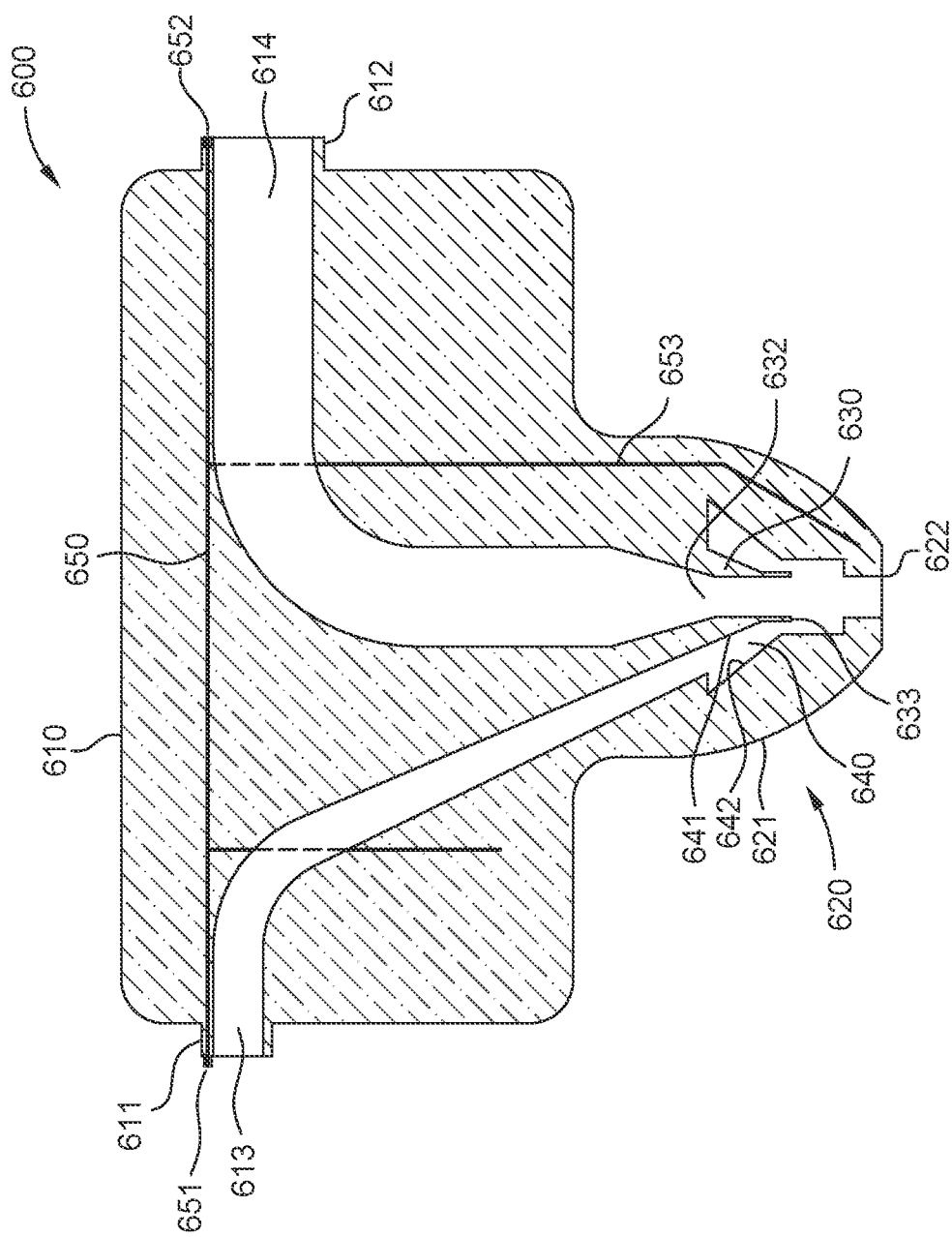
FIG. 6 illustrates a schematic cross-sectional view of a nozzle unit according to embodiment described herein.

FIG. 6 illustrates a schematic cross-sectional view of a nozzle unit 600. The nozzle unit 600 may be included in a substrate processing system, such as the CMP system 100. For example, one or more nozzle units 600 may be included in the polishing module 106 to distribute a fluid from the fluid delivery system 180 onto a polishing pad 131 of the polishing station 124. The fluid may be a cleaning fluid used during a cleaning operation.

The nozzle unit 600 includes a single-piece body 610 that includes a nozzle 620. The single-piece body 610 also includes first inlet 611 and a second inlet 612. The first inlet 611 connects to a conduit that supplies a gas, such as air, into the first inlet 611. The gas flows into the first inlet 611 and into a first flow path 613. The second inlet 612 connects to a conduit that supplies a liquid, such as a cleaning fluid, to the second inlet 612. The liquid flows into the second inlet 612 and into a second flow path 614. The liquid and the gas mixed together within the nozzle 620. The first inlet 611 and second inlet 612 may each be connected to a different conduit 500.

The nozzle 620 is formed integrally with the single-piece body 610. The nozzle 620 includes an outer portion 621, an inner portion 630, and an annular chamber 640. The outer portion 621 is shown extending from a bottom side of the single-piece body 610. The outer portion 621 includes a port 622 through which the mixture of gas and liquid that mixes within the nozzle 620 exits.

The inner portion 630 includes a third flow path 632 in communication with the second flow path 614. The third flow path 632 may have an inner diameter that is smaller than the inner diameter of the second flow path 614 thereby imposing a restriction on the liquid flow. The liquid exits the third flow path 632 and enters the annular chamber 640. The end 633 of the inner portion 630 may extend into the nozzle port 622.

The annular chamber 640 is formed within the nozzle 620 and is disposed around the inner portion 630. The upper portion of the annular chamber 640 is defined by the outer surface 641 of the inner portion 630. The lower portion of the annular chamber 640 is defined by the inner surface 642 of the outer portion 631.

Nozzle unit 600 as shown is configured for internal mixing of the gas and the liquid. The first flow path 613 directs the gas into the annular chamber 640. The annular chamber 640 is shaped to distribute the gas around the inner part 630 to mix with the fluid exiting the third flow path 632. The gas atomizes the fluid such that the liquid exits the nozzle port 622 in a desired spray pattern. In other words, the gas causes the fluid to break-up into a plurality of droplets, such as a mist. For example, the nozzle 620 may be configured such that the spray exiting the nozzle port 622 is a circular spray pattern. The circular spray pattern may be a hollow cone spray pattern such that the fluid is dispersed in a mist around a cone shaped void that contains little to no fluid mist disposed therein.

The single-piece body 610 is formed by additive manufacturing process, such as a three-dimensional (e.g., 3D) printing process. For example, the single-piece body 610 may be 3D printed from one or more materials suitable for receiving one or more fluids from the fluid source 182 used in semiconductor manufacturing. In 3D printing, a printhead ejects droplets of a formulation (e.g., ink of printable materials) onto a surface from a nozzle, then cures the droplets with a light, e.g., ultraviolet light, from a light source, such as an LED or focused lamp in the printer. The 3D printing allows for different materials to be deposited in different portions of the single-piece body 610. For example, the single-piece body 610 may be formed from a high-purity polymer material, such as a perfluoroalkoxy alkanes (PFA) material, Teflon, polyvinylidene fluoride (PVDF), or a combination of high-purity polymer materials. In some embodiments, the single piece body 610 may be made from polytetrafluoroethylene (PTFE), ethylene tetrafluoroethylene (ETFE), polyether ether ketone (PEEK), Ultem (polyetherimide), and polyethylene terephthalate (PET).

An additive manufacturing process may include, but is not limited to a process, such as a polyjet deposition process, inkjet printing process, fused deposition modeling process, binder jetting process, powder bed fusion process, selective laser sintering process, stereolithography process, vat photopolymerization digital light processing, sheet lamination process, directed energy deposition process, or other similar 3D deposition process. In some embodiments, the additive material process can be used to form the single-piece body 610 from one material or from multiple different materials.

In some embodiments, additive manufacturing may be used to form a mold of the single-piece body 610. The single-piece body 610 may then be cast in the mold. In some embodiments, the mold is a sacrificial mold which is degradable (e.g., dissolvable), allowing the single-piece body 610 cast within to be removed by degrading the mold. For example, a degradation chemical (e.g., acid) may be used to flush out the mold material used to form the first flow path 613, second flow path 614, annular chamber 640, and nozzle port 622 within single-piece body 610.

Forming the nozzle unit 600 such that the nozzle 620 is integral with the single-piece body 610 means that the nozzle unit 600 is ready for use once printed. In other words, no assembly, such as threading components together, is necessary to form the nozzle unit 600 which saves time and cost. Additionally, the first flow path 613, second flow path 614, annular chamber 640, and nozzle port 622 are not machined which further saves cost. Furthermore, a single-piece body cannot be machined to have these components formed within, instead requiring the assembly of multiple machined pieces together. Assembling multiple machined components together would also require a sealing element between the different pieces to prevent leakage.

Additionally, there are no abutting surfaces that need to be sealed since the flow paths 613, 614, annular chamber 640, and nozzle port 622 are formed within an integral single-piece body 610. In other words, the nozzle unit 600 does not need internal sealing elements, such as O-rings, disposed within to prevent leakage.

Fluid flow through the nozzle unit 600 generate electrostatic buildup. This electrostatic buildup can discharge and cause the material of the, to melt or degrade, which can result in the formation of a leak path. The single-piece body 610 includes a ground path 650 to discharge electrostatic build up in the nozzle unit 600 generated by the flowing fluid to a ground. The ground path 650 may be formed from a material that is more electrically conductive than the material that the single-piece body 610 is formed from. The ground path 650 may be a conductive wire or filament, such as a copper wire, that the single-piece body 610 is printed or cast around. In some embodiments, the ground path 650 is also formed by additive manufacturing. For example, the ground path 650 is printed from a conductive material during the printing of the single-piece body 610 from a polymer material. For example, this conductive material may be a printed from a metallic material, such as aluminum or copper.

The ground path 650 may be integrated into a ground circuit that leads to a ground of the fluid delivery module 184. For example, the ground path 650 may have a first contact 651 formed on the first inlet 611 and a second contact 652 formed on the second inlet 612 that are each connectable to another ground path.

In some embodiments, the ground path 650 may have one or more segments 653 that extend to different regions within the single piece body 610. For example, one segment 653 may extend to the nozzle 620.

In some embodiments, a nozzle unit may be configured for external mixing, such that the annular chamber is configured to distribute the gas at the liquid exiting the inner portion such that the mixing occurs outside of the nozzle port. The annular chamber may be shaped to have exits that direct the gas to create a desired spray pattern, such as a flat fan pattern.

While the foregoing is directed to embodiments of the present disclosure, other and further embodiments of the disclosure may be devised without departing from the basic scope thereof, and the scope thereof is determined by the claims that follow.

What is claimed is:

1. A fluid assembly, comprising:
    a base including:
        a single-piece body including a base outlet, a base inlet, a first interface including a first interface inlet and a first interface outlet, and an integral valve that comprises a first valve member formed within the single-piece body that is moveable from an open position where fluid is allowed to flow through the integral valve and a closed position blocking flow through the integral valve;
        a first flow path segment formed within the single-piece body that extends from the base inlet to the first interface outlet;
        a second flow path segment formed within the single-piece body that extends from the first interface inlet; and
        a ground path disposed within the single-piece body.

2. The fluid assembly of claim 1, wherein the single-piece body is formed by three-dimensional printing.

3. The fluid assembly of claim 1, wherein the first flow path includes the integral valve, and wherein the first valve member blocks fluid flow through the first flow path when in the closed position.

4. The fluid assembly of claim 1, wherein the integral valve and single-piece body are formed together by three-dimensional printing.

5. The fluid assembly of claim 1, wherein the first valve member is attachable to a valve actuator configured to move the first valve member between the open and closed positions.

6. The fluid assembly of claim 1, wherein the ground path is formed is formed by three-dimensional printing of a conductive material while the single-piece base is being formed.

7. The fluid assembly of claim 1, wherein the ground path extends from a first contact located at a first end of the base to a second contact located at a second end of the base.

8. The fluid assembly of claim 1, further comprising:
    a first device attachable to the first interface to fluidly connect a first device inlet to the first interface outlet and a second device outlet to the second interface inlet.

9. The fluid assembly of claim 8, wherein the ground path extends to a first interface contact formed on the interface surface configured to interface with a first device contact of the first device.

10. The fluid assembly of claim 8, the ground path comprising:
    a first ground segment formed in the single-piece body and including a first interface contact formed on the interface surface;
    a second ground segment formed in the single-piece body and including a second interface contact formed on the interface surface; and
    a third ground segment formed in the first device engageable with the first interface contact and the second interface contact when the first device is attached to the interface surface.

11. The fluid assembly of claim 8, wherein the first device is selected from the group consisting of a valve, a pressure transducer, a flow controller, a flow meter, a temperature sensor, a check valve, a pressure regulator, and mixer.

12. A fluid assembly, comprising:
    a base including:
        a single-piece body including a base outlet, a base inlet, a first interface including a first interface inlet and a first interface outlet, and a second interface including a second interface outlet and a second interface inlet;
        a first flow path segment formed within the single-piece body that extends from the base inlet to the first interface outlet;
        a second flow path segment formed within the single-piece body that extends from the first interface inlet, the second flow path segment in the single-piece body extending from the first interface inlet of the first interface to the second interface outlet of the second interface;
        a ground path disposed within the single-piece body; and
        a third flow path segment in the single-piece body extending from the second interface inlet of the second interface.

13. The fluid assembly of claim 12, further comprising a second device including a second device inlet and a second device outlet, the second device attachable to the base at the second interface to connect the second device inlet to the second interface outlet and to connect the second device outlet to the second interface inlet.

14. The fluid assembly of claim 12, wherein the third flow path segment extends to the base outlet.

\* \* \* \* \*